US006833183B2

(12) United States Patent
Klasterka

(10) Patent No.: US 6,833,183 B2
(45) Date of Patent: Dec. 21, 2004

(54) APPARATUS AND A METHOD FOR SCATTERING PARTICLES TO FORM A MAT

(75) Inventor: Stanislav Klasterka, Übach-Palenberg (DE)

(73) Assignee: Timberex-Timber Exports, Ltd., Jersey (GB)

( * ) Notice: Subject to any disclaimer, the term of this patent is extended or adjusted under 35 U.S.C. 154(b) by 437 days.

(21) Appl. No.: 09/778,587

(22) Filed: Feb. 7, 2001

(65) Prior Publication Data

US 2001/0017428 A1 Aug. 30, 2001

Related U.S. Application Data

(63) Continuation of application No. PCT/EP99/09984, filed on Dec. 15, 1999.

(30) Foreign Application Priority Data

Dec. 16, 1998 (DE) ........................................ 198 58 096

(51) Int. Cl.[7] ................................................ B32B 5/16

(52) U.S. Cl. ................. 428/323; 428/292.1; 428/292.4; 428/332; 428/357; 428/363; 428/401; 428/221

(58) Field of Search ............................. 428/292.1, 221, 428/292.4, 317.9, 323, 332, 357, 363, 401; 156/62.2

(56) References Cited

U.S. PATENT DOCUMENTS 4,413,031 A 11/1983 Poppelreuter ............... 428/212
4,521,477 A 6/1985 Kiss ........................... 428/282
5,718,786 A * 2/1998 Lindquist et al. .......... 156/62.2

FOREIGN PATENT DOCUMENTS

| | | |
|---|---|---|
| DE | 1 206 147 | 12/1965 |
| DE | 1 528 271 | 2/1970 |
| DE | 41 13 843 | 10/1992 |
| DE | 42 15 857 | 11/1993 |
| DE | 42 34 284 | 4/1994 |
| DE | 44 34 876 | 4/1996 |
| DE | 44 39 271 | 6/1996 |
| DE | 195 03 407 | 8/1996 |
| EP | 860 254 | 6/1996 |
| EP | 257 117 | 3/1998 |
| EP | 259 069 | 3/1998 |

* cited by examiner

*Primary Examiner*—Merrick Dixon
(74) *Attorney, Agent, or Firm*—Fitch Even Tabin & Flannery

(57) ABSTRACT

An apparatus is described for scattering particles, in particular particles admixed with at least one binder, such as, for example, fibers, chips or like particles containing lignocellulose and/or cellulose, to form a mat, in particular for manufacturing shaped articles, primarily in the form of boards. On the one hand, chipboards, fiberboards and chip/fiber combination boards can be manufactured in an economically favorable manner with the apparatus and method described. Furthermore, boards of variable width can be produced without a time-consuming conversion of the apparatus being necessary.

3 Claims, 3 Drawing Sheets

APPARATUS AND A METHOD FOR SCATTERING PARTICLES TO FORM A MAT

Figure 1:
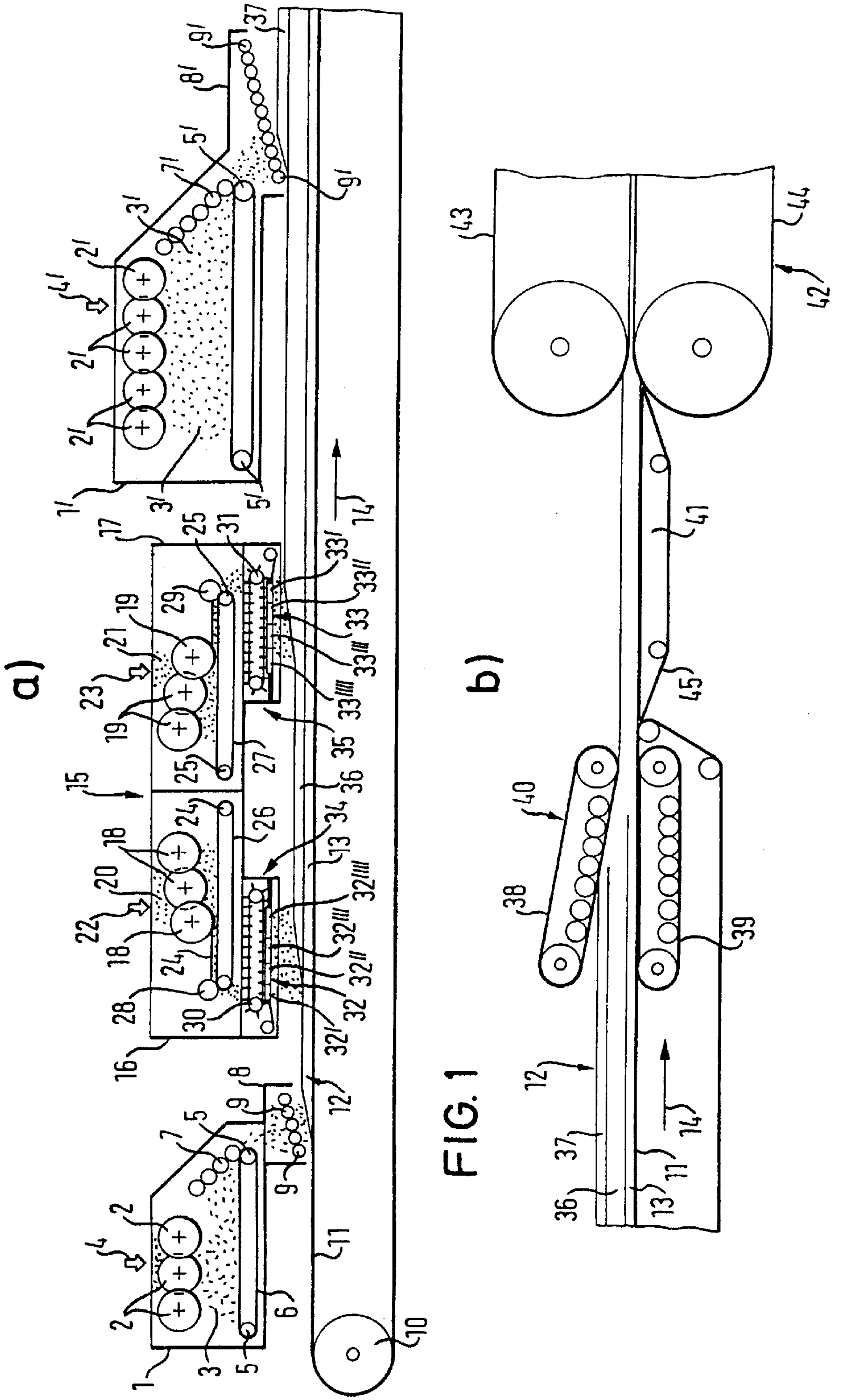

This is a continuation, prior application number PCT/EP99/09984, filed Dec. 15, 1999 and designating the U.S. which is hereby incorporated herein by reference in its entirety.

The present invention relates to an apparatus for scattering particles, in particular particles admixed with at least one binder, such as, for example, fibers, chips or like particles containing ligno-cellulose and/or cellulose, to form a mat, in particular for manufacturing shaped articles, primarily in the form of boards, having at least one metering hopper containing the particles, having at least one scattering station for the particles positioned after the metering hopper and having a forming band to receive the mat arranged underneath the scattering station. Furthermore, the invention is directed to a method for the manufacture of chip/fiber combination boards comprising in each case two cover layers formed from fibers admixed with at least one binder and an intermediate layer arranged between the cover layers and formed from chips admixed with at least one binder, in particular for the operation of a corresponding apparatus, and to a corresponding chip/fiber combination board. Finally, the subject of the invention is also an apparatus and a method for scattering particles to form a mat of variable width.

Apparatuses for scattering mats are known in a number of variants, with these apparatuses usually being specifically adapted in each case to the end product to be manufactured, for example to the kind of board to be manufactured (fiberboard, chipboard or chip/fiber combination board) and to a respective fixed width of the mat to be scattered. A change in manufacture from one product kind to another product kind and from one mat width to another mat width requires a relatively time-consuming conversion of the plant, plant downtimes associated therewith and relatively high costs.

It is an object of the invention to provide an apparatus and a method of the kind initially mentioned which allow in a very variable manner the manufacture of different kinds of product, i.e. alternatively chipboard, fiberboard or chip/fiber combination boards or boards with different widths at an economically justifiable effort and cost.

This object is satisfied in accordance with the invention by the features of the claims. A chip/fiber combination board in accordance with the invention is characterized by the features of the claims.

The apparatus in accordance with the invention according to claim 1 allows both the manufacture of single-layer or multi-layer chipboards or fiberboards and of chip/fiber combination boards without any time-consuming and costly conversion of the apparatus being required. The chip/fiber combination boards which can be produced with this apparatus moreover have a very high strength and optimum surface properties, with, at the same time, the cover layers consisting of fibers or chips having a relatively thin form. These advantages are achieved by the chip scattering station formed to scatter the intermediate layer comprising a fractionating device for the separation of fine and coarse chips, with the fine chips being scattered as the outer layers of the intermediate layer and the coarse chips being scattered as the inner layer of the intermediate layer. It is achieved in this way that the fine fibers of the cover layers do not come into contact with the coarse chips, but with the fine chips of the intermediate layer, whereby a substantially better connection is achieved between the cover layers and the intermediate layer.

The fine chips lying at the outsides of the intermediate layer furthermore form a buffer zone in each case between the fibers forming the cover layer and the coarse chips forming the core. This buffer zone prevents the coarse structure of the coarse chips pressing through the cover layers consisting of fibers, whereby the surface of the boards produced from the mat would receive an unwanted roughness. This so-called "telegraphing" of the coarse chips to the outside of the boards is thus prevented in chip/fiber combination boards manufactured with the apparatus in accordance with the invention.

The same advantages are achieved in accordance with the method of the invention, since the chip/fiber combination boards manufactured in accordance with this method have, on the one hand, a particularly high strength due to the increased connection between the cover layers and the intermediate layer and, on the other hand, optimum surfaces due to the prevented telegraphic effect. The chip/fiber combination boards obtained in this manner have a very compact surface which is, for example, ideally suited for lacquering since the required lacquer quantity can be reduced due to the compact surface.

The apparatus formed in accordance with the invention is, however, also suitable for producing pure chipboards and pure fiberboards in addition to producing chip/fiber combination boards, with both single-layer and multi-layer chip/fiber boards being able to be produced. If only chipboards are to be produced, the fiber scattering stations are switched off so that a mat is scattered onto the forming band only from the chip scattering station. The scattered mat can then have, for example, an intermediate layer consisting of coarse chips and two outer cover layers consisting of fine chips. However, it is also possible to load the fractionating device exclusively with homogeneous chips so that a single-layer chip mat can be scattered If only single-layer or multi-layer fiberboards are to be produced, then the chip scattering station can be deactivated accordingly so that only a mat consisting of fibers is scattered onto the forming band. Only one of the fiber scattering stations or both scattering stations can then be activated depending on the desired thickness of this mat.

The fiber scattering stations are advantageously designed to scatter homogeneous fiber material, since the apparatus in accordance with the invention can be simplified in this way. Since a fractionating of the chips is carried out at the time the intermediate layer consisting of these chips is formed, so that the fine chips come to rest at the outside of the intermediate layer, the optimum connection between the intermediate layer and the cover layers can be produced by this fractionating so that a corresponding fractionating of the fibers forming the cover layers becomes superfluous.

To allow the alternative manufacture of chipboards, fiberboards or chip/fiber combination boards, the scattering stations can be controllable independently from one another. Furthermore, each scattering station can have its own metering hopper associated with it; or a common metering hopper can be associated with at least a part of the fiber scattering stations, in particular all fiber scattering stations. The use of a common metering hopper ensures that cover layers scattered from the fiber scattering stations are each loaded with the same homogeneous fiber material.

In accordance with a further advantageous embodiment of the invention, the scattering stations are formed separately from one another. This modular construction means that standard scattering stations can be used so that the costs of a corresponding apparatus formed in accordance with the invention can be reduced.

The apparatus formed in accordance with the invention can have both a continuous press and a synchronized press downstream to press the scattered mat, with the pressing of the mat usually taking place with the simultaneous supply of heat, with a pre-heating of the mat additionally being able to be carried out in particular directly prior to the downstream pressing apparatus and a pre-pressing of, for example, the part mat scattered by the fiber scattering station arranged at the entry side being carried out.

It is possible with an apparatus as disclosed to scatter mats of different widths without, for example, having to provide conveyor belts or scattering devices of varying widths. Such an apparatus is operated particularly advantageously in accordance with the disclosed method.

Since the particles are initially scattered onto the forming band in a normal, full-area manner from a scattering station, i.e. with the maximum width given by the scattering station, a standard scattering station can be used without any alterations having to be made to it. Only the mat arranged on the forming band in its full width is reduced to the desired width by the particle separating device provided at the top side of the forming band, with the excess particles being carried off to the side. Mats of any width can thus be produced using standard scattering stations and standard conveyor belts due to the adjustability of the particle separating device.

To achieve a symmetrical arrangement of the mat on the forming band, the particle separating device comprises preferably two part units arranged symmetrically to the longitudinal axis of the forming band. These can be formed, for example, as rotating separating units with which the particles forming the marginal regions of the mat can be transported off to the side. The part units can, for example, also be formed as separating walls which extend at least regionally substantially parallel to the direction of movement of the forming band and which are aligned substantially perpendicular to the forming band. The width of the scattered mat can be reduced to the desired width by an adjustment of the rotating separating units or separating walls in the horizontal direction, in particular transversely to the forming band. The particles led off to the side by the particle separating device can then be fed back to the metering hopper of the scattering device so that they are available for the further scattering procedure.

If a plurality of scattering stations are connected one after the other to produce multi-layer mats, then the mat initially scattered at maximum width from the first scattering station can be reduced to the desired width, for example, by rotating separating units, with the particles separated by the separating units being fed back to the metering hopper of the first scattering station. The mat reduced in width in this way is conveyed on the forming band to the next scattering station where it is guided, for example, between two separating walls prior to reaching the scattering region. These separating walls extend over the whole length of the second scattering station so that the particles also scattered at maximum width by this second scattering station come to rest in part on the part mat scattered from the first scattering station within the separating walls and in part directly on the forming band outside the separating walls. Since a mixture of particles of the first scattering station and the second scattering station is prevented outside the separating walls in this way, the particles outside the separating walls can, after passing the second scattering station, also be carried off to the side by separating units and fed back to the metering hopper of the second scattering station.

After this leading off to the side of the excess particles, a two-layer mat of the desired reduced width is thus present on the forming band and this mat can be conveyed with or without separating walls to a further scattering station or to a pressing apparatus.

If the two-layer mat is led to a further scattering station, a further layer can initially be scattered with full width there in an analog manner by means of separating walls and subsequent, rotating separating units, with the excess particles subsequently being carried off in an unmixed state again to produce the desired reduced width and being fed to the metering hopper of the third scattering station for further use.

To achieve both the advantages with respect to the variable width adjustment and the alternative manufacture of chipboards, fiberboards or chip/fiber combination boards, the different apparatuses and methods described in the claims can be combined with one another as required.

Further advantageous embodiments of the invention are given in the dependent claims.

Figure 2:
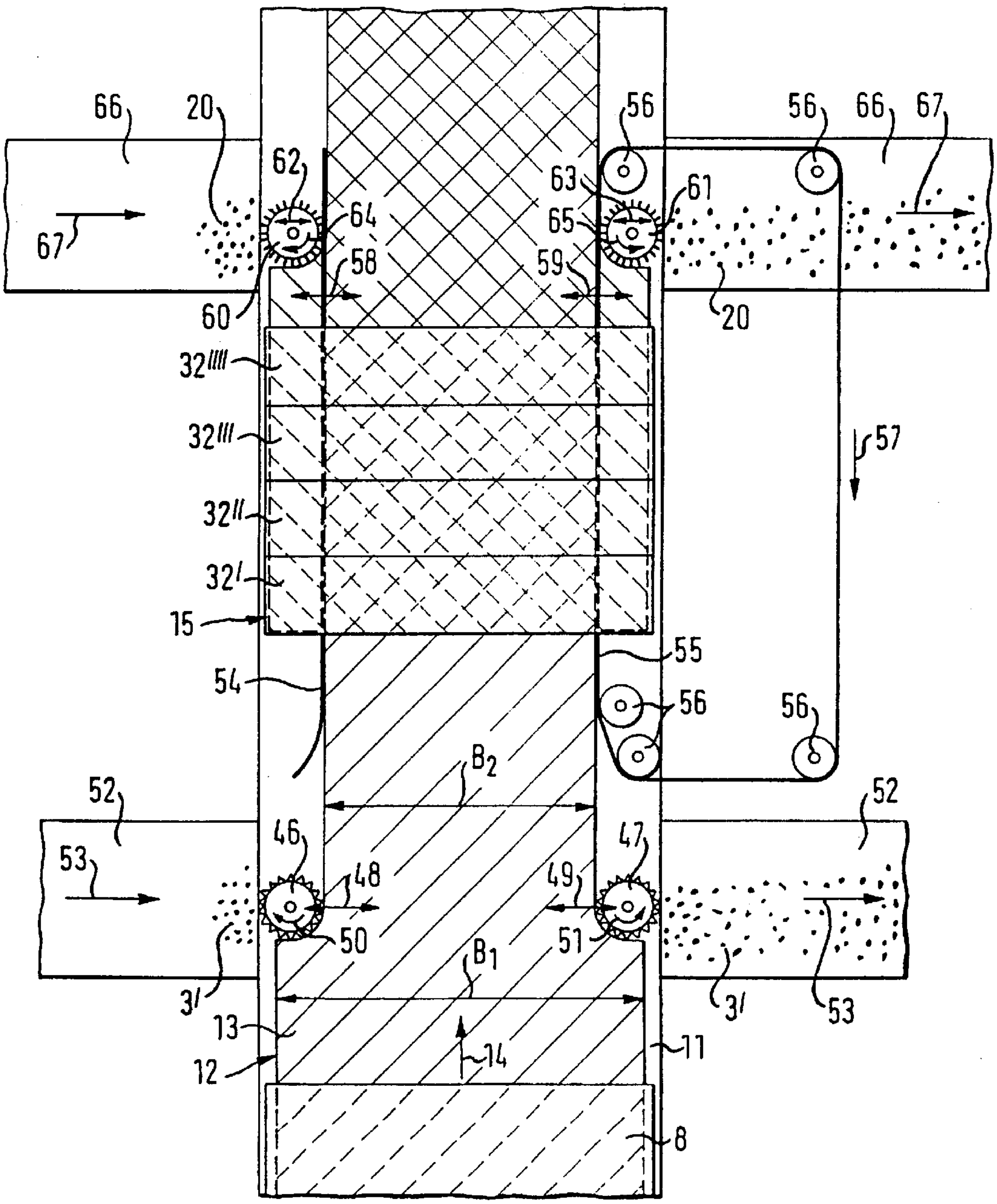
Figure 3:
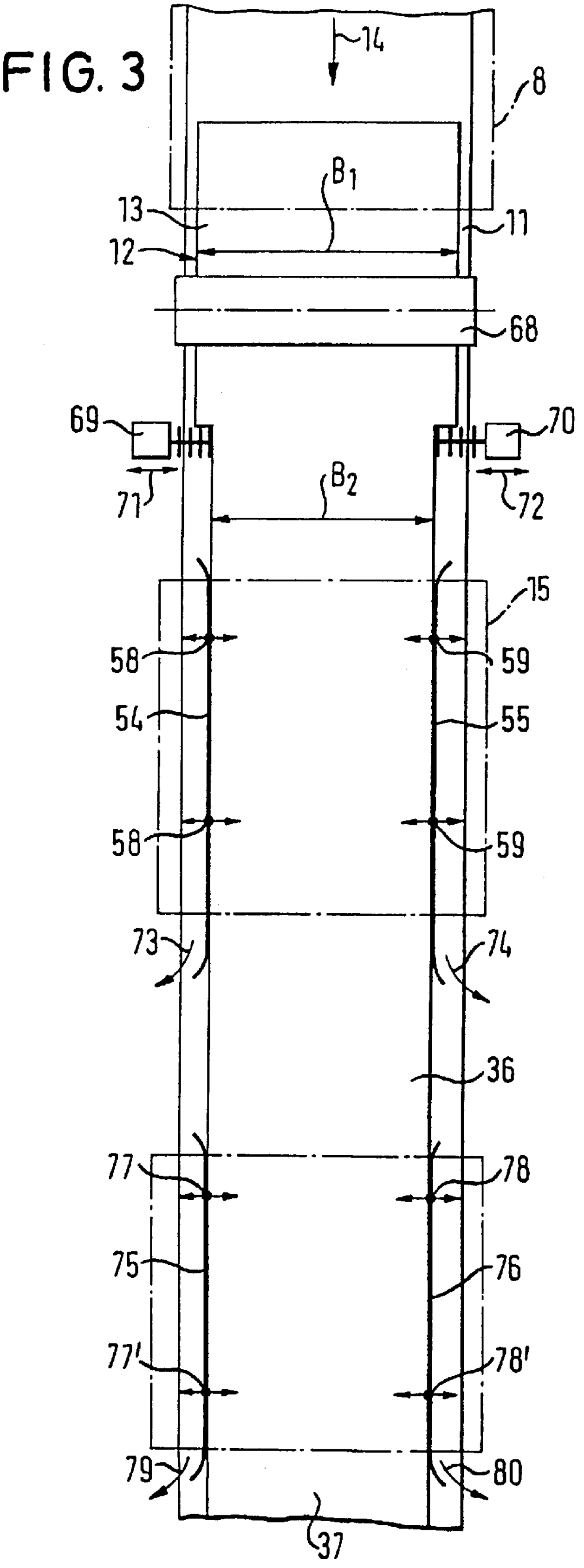

The invention is explained in more detail in the following by way of an embodiment with reference to the drawings, in which are shown:

FIG. 1 a schematic side view of an apparatus formed in accordance with the invention;

FIG. 2 a very schematic plan view of a part of the apparatus of FIG. 1; and FIG. 3 an embodiment of the invention modified with respect to FIG. 2.

The apparatus shown in FIG. 1 comprises a metering hopper 1 arranged at the entry side, in which a plurality of back-brushing rakes 2 are arranged. Homogeneous fiber particles 3 admixed with at least one binder are poured as bulk material into the metering hopper 1 as is indicated by an arrow 4.

A bottom belt 6 is arranged on the lower side of the metering hopper 1 via two pulleys 5 and the fiber particles 3 are conveyed via said belt in the direction of discharge rolls 7.

The particles 3 carried out of the metering hopper 1 via the discharge rolls 7 and the bottom belt 6 are scattered onto a forming band 11 circulating endlessly around pulleys to form a mat 12 via a fiber scattering station 8 with scattering rolls 9 arranged at the entry side.

In this way, a lower cover layer 13, consisting of homogeneous fiber particles 3 of the mat 12 admixed with at least a binder, is first produced by the fiber scattering station 8.

A scattering station 15 for scattering of chips 20, 21 is located downstream of the fiber scattering station 8 at the entry side in the direction of transport of the forming band 11 represented by an arrow 14.

The chip scattering station 15 comprises two metering hoppers 16, 17, in each of which a plurality of back-brushing rakes 18, 19 is arranged. The bulk material consisting of chips 20, 21 of different sizes and of at least one binder is fed to the metering hoppers 16, 17 from above as is indicated by the arrows 22, 23.

A respective bottom belt 26, 27 is arranged on the lower side of the metering hopper 16, 17 and runs via two pulleys 24, 25, said belt forming a discharge unit for the chips 20, 21 together with a discharge roll 28, 29 in each case.

A scraping belt 30, 31 guided in each case endlessly via two pulleys is arranged beneath the discharge rolls 28, 29 and its lower run is guided in each case via sieve devices 32, 33 with varying mesh sizes so that different sections 32'. 32", 32'" and 32"" or 33', 33", 33'" and 33"" of the sieve devices 32, 33 are formed. The sieve devices 32, 33, together with the scraper belts 30, 31, form fractionating devices 34, 35 by which the chips 20, 21 can be fractionated according to their size.

The sections 32'. 32", 32'" and 32"" or 33', 33", 33'" and 33"" of the sieve devices 32, 33 are arranged such that the fine chips 20, 21 are each scattered onto the lower cover layer 13 in the regions of the chip scattering station 15 lying on the outside in the direction of transport of the mat, while the coarse chips 20, 21 are scattered onto the cover layer via the inner regions of the fractionating devices 34, 35.

An intermediate layer 36 of the mat 12 is produced in this way which has fine chips 20, 21 at its outer positions and coarse chips 20, 21 at its inner positions. The fiber particles 3 thus meet the fine chips 20, 21 at the connection plane between the intermediate layer 36 and the lower cover layer 12.

A preferred embodiment of the chip scattering station 15 is described in the German patent 197 16 130 so that the content of this patent is expressly included in the present application for a more detailed description of the chip scattering station 15, in particular with respect to the formation of the scraper belts 30, 31, of the sieve devices 32, 33, and of the axially symmetrical positioning of the two part scattering stations behind one another. It is generally also possible to form the chip scattering station 15 in a different suitable manner, with it only being necessary for fractionating of the chips 20, 21 into fine and coarse chips to take place and for the intermediate layer scattered by the scattered chips 20, 21 to have the fine chips in its outer positions and the coarse chips in its intermediate position.

The chip scattering station 15 has a fiber scattering station 8' with a metering hopper 1' downstream at the exit side and said fiber scattering station 8' is formed according to the fiber scattering station 8 arranged at the entry side. The individual elements of the fiber scattering station 8' and of the metering hopper 1' are accordingly provided with the same reference numerals as in the fiber scattering station 8 at the entry side and the metering hopper 1 at the exit side, with the reference numerals only being provided with a stroke.

An upper cover layer 37 of homogeneous fiber particles 3' is scattered onto the intermediate layer 36 with the fiber scattering station 8' so that the fine fiber particles 3' come into connection with the fine chips 20, 21 at the connection point between the upper cover layer 37 and the intermediate layer 36.

The apparatus shown in FIG. 1 is continued in the direction of the arrow 14 in FIG. 1*b*. The mat 12 is guided through a pre-pressing unit 40 formed by two circulating, endless belts 38, 39, with the mat being pre-compacted by said pre-pressing unit 40. Any air contained in the mat material is then pressed out, which is achieved in particular due to the elongate intake due to the flat opening angle between the endless belts 38 and 39.

The pre-pressed mat 12 exiting the pre-pressing unit 40 is guided via a pre-heating device 41, indicated only schematically, with which, for example, heated steam, heated air, a heated mixture of steam and air and any further additives are introduced into the pre-compacted mat 12.

A pressing unit 42 connects directly to the pre-heating unit 41; in the embodiment shown, this pressing unit 42 is formed as a continuous pressing unit with circulating pressing belts 43, 44. The mat 12 is pressed to its final thickness in the pressing apparatus 42 with heat being supplied. It is generally also possible to provide a synchronized press instead of a continuous pressing apparatus.

A pre-pressing unit and/or a pre-heating unit can generally be provided at any point within the apparatus shown in FIG. 1. For instance, a pre-pressing unit can be provided between the fiber scattering station 8 at the entry side and the chip scattering station 15, in particular to pre-press the lower cover layer 13. A corresponding pre-press unit can also be provided between the chip scattering station 15 and the fiber scattering station 8' at the exit side.

The forming band is preferably formed in an airtight manner, while the belt 45 carrying the mat 12 can be formed in an air-permeable manner, for example for the supply of heating medium into the mat 12.

It is important that, on the one hand, an intensive connection is produced between the cover and intermediate layers, which enter into a faster and more intensive connection during pressing, due to the direct contact of fine fiber particles 3, 3' of the two cover layers 13, 37 with the outer fine chips 20, 21 of the intermediate layer 36, with the heat being supplied during pressing simultaneously penetrating the whole mat 12 more quickly.

FIG. 2 shows a part of the apparatus of FIG. 1 in a top view in very simplified form.

The fiber scattering station 8 at the entry side can be seen at the lower margin of FIG. 2 and is used to scatter the lower cover layer 13 of the mat 12 onto the forming band 11. The mat 12, which is shown hatched, is here scattered at a maximum width $B_1$ which is slightly smaller than the width of the forming band 11.

The fiber scattering station 8 has separating units 46, 47 arranged downstream of it in the direction of transport 14 which are aligned essentially perpendicular to the forming band and which are adjustable transversely to the direction of transport of the forming band 11, as is indicated by arrows 48, 49. The separating units 46, 47 can be formed, for example, as rotating rolls with a grooved surface and/or with a star-shaped cross-section, as rotating brushes or as any other separating units suitable for the separation of the particles arranged in the marginal region of the mat 12.

The separating units 46, 47 can be rotated in accordance with arrows 50, 51 such that the fiber particles forming the marginal regions of the mat 12 are carried off to the side. The fiber particles 3 carried off fall onto a carry-off belt 52 which is arranged beneath the forming band 11, which can be moved along arrows 53 and with which the particles 3' are carried back to the metering hopper 1.

The width $B_2$ of the mat 12 can be set to any value by the adjustability of the separating units 46, 47 transversely to the direction of transport of the forming band 11.

Separating walls 54, 55 are arranged essentially parallel to the direction of transport in the region of the surface of the forming band 11, after the separating units 46, 47 in the direction of transport, such that the space between the separating walls 54, 55 is essentially identical to the width $B_2$ of the mat 12. The separating walls 54, 55 are only deformed outwardly in the intake region such that a reliable introduction of the mat 12 into the region between the separating walls 54, 55 is carried out without the mat 12 being torn at its side regions.

While the separating wall 54 is formed as a board-like wall section, the separating wall 55 is formed by an endless circulating belt which is movable along an arrow 57 via deflecting rolls 56. However, generally, both separating walls 55, 55 can be formed in the same way.

The formation of the separating wall 55 as a circulating endless belt means that the friction between the outside edge of the mat 12 and the separating wall 55 is reduced or made zero. Impairment to the mat outer edge is prevented in this way.

The separating walls 54, 55 are adjustable transversely to the direction of transport of the forming band 11, as is indicated by arrows 58, 59. The part of the chip scattering station 15 at the entry side is arranged above the separating walls 54, 55 and said chip scattering station 15 comprises, for example, in accordance with the illustration in FIG. 2, four sieve devices 32', 32", 32'", 32"", with the sieve devices 32', 32", 32'", 32"" being selected such that the mesh size of the corresponding sieves increases in the direction of transport 14 of the forming band 11. In this way, fine chips are first scattered onto the mat 12 with reduced width and the coarse chips are scattered at the exit side end of the part of the chip scattering device 15 at the entry side.

No mixing of fibers 3 and chips 20 is effected on the side outside the separating walls 54, 55 so that the chips 20 scattered onto the forming band 11 outside the separating walls 54, 55 can be carried off to the side by separating units 60, 61 positioned after the chip scattering device 15, in a similar way to that already described with reference to the separating units 46, 47.

The separating units 60, 61 are also adjustable transversely to the direction of transport of the forming band 11, as is indicated by arrows 62, 63. The separating units 60, 61 can be adapted in this way to the width $B_2$ of the mat 12.

The separating units 60, 61 can be rotated in accordance with the arrows 64, 65 so that the chips 20 are carried off to the side onto a carry-off belt 66 provided beneath the shaping belt 11. The carry-off belt 66 is moved along arrows 67 so that the chips on the carry-off belt 66 can be carried back to the metering hopper 16 of the chip scattering device.

Since the separating walls 54, 55 have the effect that chips 20 and fibers 3 are only mixed with each other between the separating walls 54, 55, but that the chips come to rest in unmixed form outside the separating walls 54, 55, a return of the chips 20 to the metering hopper 16 is unproblematic.

The separating walls 54, 55 extend up to behind the separating units 60, 61, since the laterally excess chips 20 are carried off completely from this region so that the separating walls 54, 55 are no longer required in the region behind the separating units 60, 61. New separating walls in accordance with the separating walls 54, 55 shown in FIG. 2 must be provided again only in the region of the second part of the chip scattering device not shown in FIG. 2. It is, however, generally also possible to extend the separating walls 54, 55 over the whole length of the apparatus of FIG. 1.

Generally, the separating units 46, 47, 60, 61 and the separating walls 54, 55 in accordance with FIG. 2 are also provided in the apparatus in accordance with FIG. 1. These elements have only not been shown in FIG. 1 for reasons of better illustration. If a variable width adjustment of the apparatus in accordance with FIG. 1 is not required, the separating units 46, 47, 60, 61 and the separating walls 54, 55 can also be omitted. Furthermore, corresponding separating units and separating walls can also be used with apparatuses having only one single scattering device or any number of scattering devices in order to obtain an apparatus with variable width scattering in this way. The separating walls can be omitted in an apparatus with only one single scattering station and the desired width $B_2$ of the mat be achieved only by the rotating separating units after the scattering of a mat over the maximum width $B_1$.

The embodiment in accordance with FIG. 3 differs from the embodiment in accordance with FIG. 2 substantially by a different design of the separating units.

The cover layer 13 scattered from the scattering station 8 with the width $B_1$ is first pre-compacted in a pre-press apparatus 68. The pre-compacted cover layer 13 is subsequently reduced to the desired width $B_2$ by two edging saws 69, 70 arranged to the side of the forming band 11. The edging saws 69, 70 are adjustable along arrows 71, 72 transversely to the direction of movement 14 of the forming band 11 so that the width of the cover layer 13 can be set variably. During edging, or immediately thereafter, the separated fiber particles are sucked off pneumatically and carried back to the entry-side metering hopper 1 of the fiber scattering station 8 at the entry side.

The lower cover layer 13 reduced to the width $B_2$ is, as already described with respect to FIG. 2, guided between two separating walls 54, 55, with the chips 20 simultaneously being scattered onto the cover layer 13 by the chip scattering station 15 to form the intermediate layer 36 of the mat 12.

The separating walls 54, 55 are each bent outwardly to the side at their ends so that the chips 20 scattered onto the forming band 11 outside the separating walls 54, 55 are carried off to the outside due to the movement of the forming band 11, as is indicated by arrows 73, 74. The transporting away of the chips 20 is supported by carry-off devices (not shown), for example spiral conveyors, suction units, brush rolls or the like. It is generally also possible to form the ends of the separating walls to extend in a straight manner and to make the carrying off possible only by the said carry-off devices. Furthermore, it is also possible to guide the ends of the separating walls 54, 55 up to the outer edge of the forming band or beyond so that the carrying-off of the chips 20 takes place only via the separating walls 54, 55. The chips 20 carried-off are then supplied in the normal manner to the metering hoppers 16, 17.

Separating walls 75, 76 are also provided underneath the fiber scattering station 8' at the exit side to separate the laterally excess fibers 3' from the fibers 3' forming the upper cover layer 37 with the width $B_2$. The separating walls 75, 76 are formed adjustably transversely to the direction of transport of the mat 12, as is indicated by arrows 77, 77', 78, 78'. The excess fibers 3' can be carried off to the side along arrows 79, 80 in a similar manner to the chips 20 previously described, with here, however, the suction of the fibers 3' being preferred. The carried-off fibers 3' are in turn supplied to the metering hopper 1' for further use.

A vertically adjustable evener roll aligned transversely to the direction of transport of the forming band 11 can be arranged between the fiber scattering station 8 at the entry side and the pre-pressing apparatus 68 in order to even out the lower cover layer 13 of the mat 12. A continuous measurement and monitoring of the lower cover layer 13 to be evened is possible, for example, by a downstream basis weight measurement and regulation system by which the vertical adjustment of the evener roll can be regulated. A pre-settable basis weight of the lower cover layer 13 of the mat 12 can then be kept constant by this vertical adjustment.

The intermediate layer and/or the upper cover layer 37 of the mat 12 can also have an evener roll and a basis weight measurement and regulation system associated with it. When the arising excess chips and/or fibers are evened out, carrying off is effected in each case, for example, sucking off, and a return to the respective metering hopper 1, 1', 16, 17 carried out.

What is claimed is:

1. A chip/fiber combination board comprising:

an upper and lower cover layer formed from fibers admixed with at least one binder, the upper and lower cover layers including essentially homogeneous fiber material; and an intermediate layer arranged between the cover layers and formed from chips admixed with at least one binder, the intermediate layer including three layers with an inner layer of coarse chips and outer layers of finer chips.

2. A chip/fiber combination board in accordance with claim 1, wherein the fiber material of the lower and upper cover layers is formed essentially identically.

3. A chip/fiber combination board in accordance with claim 1 or claim 2, wherein the chips of the outer layers of the intermediate layer have essentially the same size.

* * * * *